March 13, 1951 — W. H. DIELSCHNEIDER — 2,545,074
DISK TYPE MOWER
Filed Dec. 19, 1945 — 4 Sheets-Sheet 1
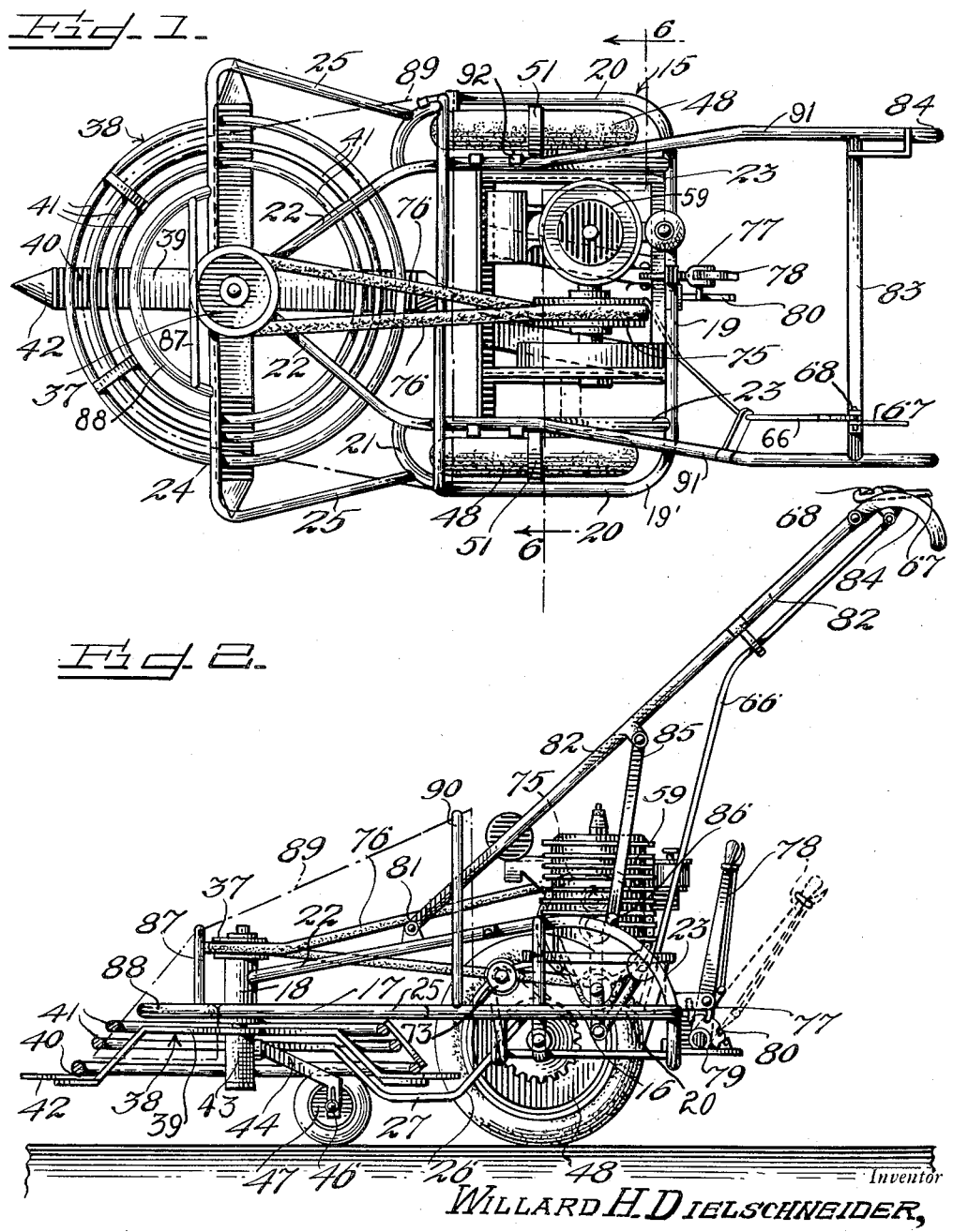
Inventor
WILLARD H. DIELSCHNEIDER,
By Clarence A. O'Brien
and Harvey B. Jacobson
Attorneys

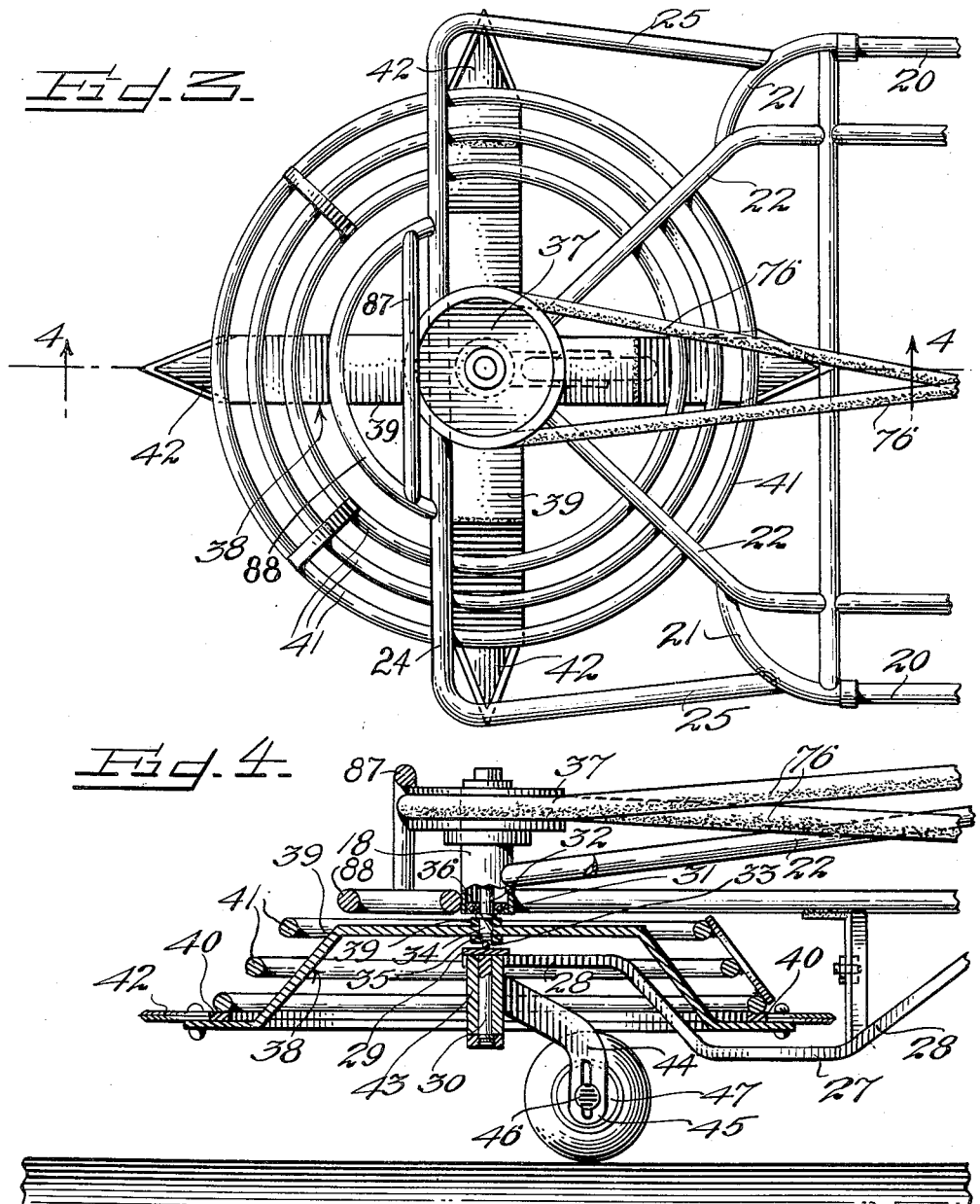

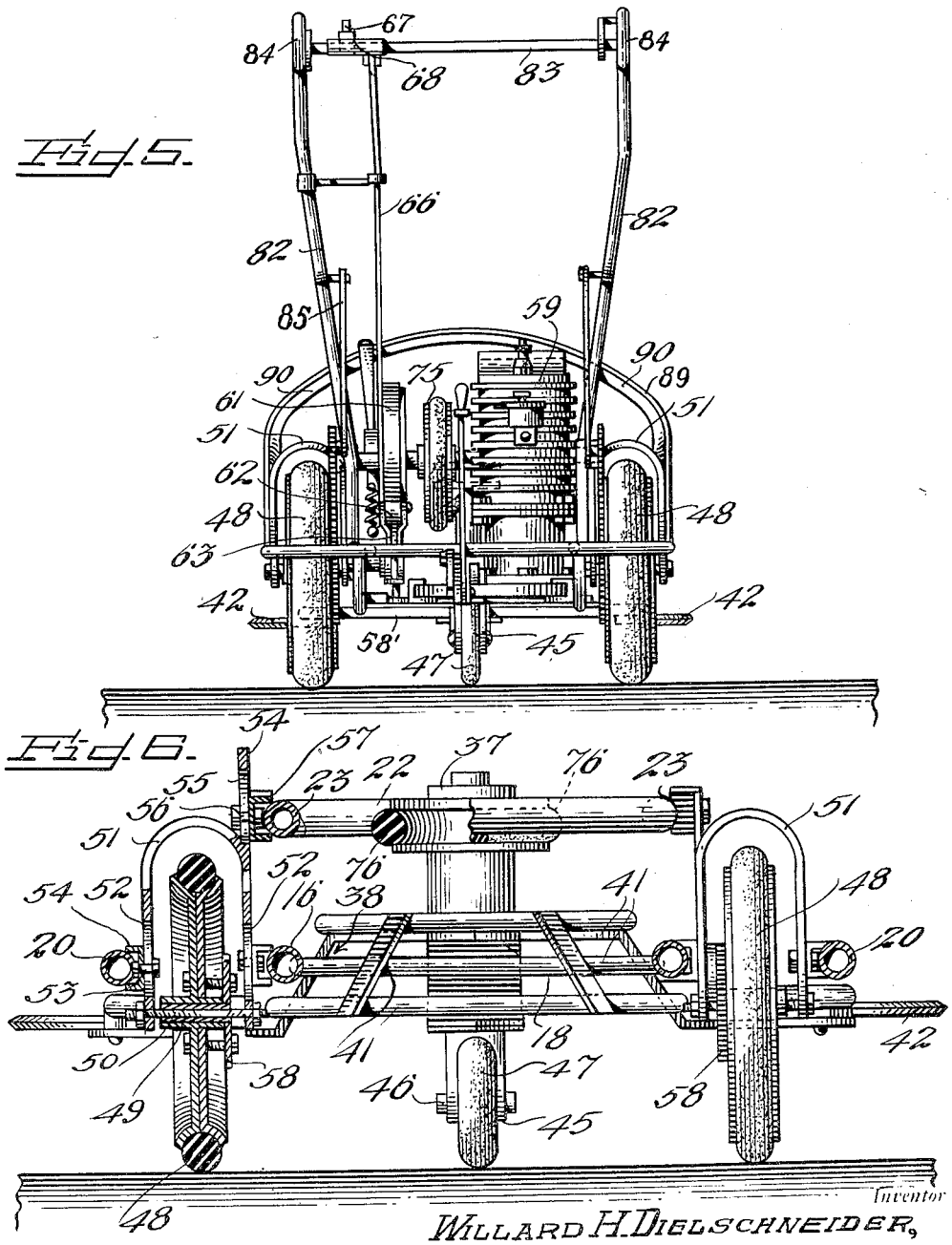

March 13, 1951 W. H. DIELSCHNEIDER 2,545,074
DISK TYPE MOWER
Filed Dec. 19, 1945 4 Sheets—Sheet 4
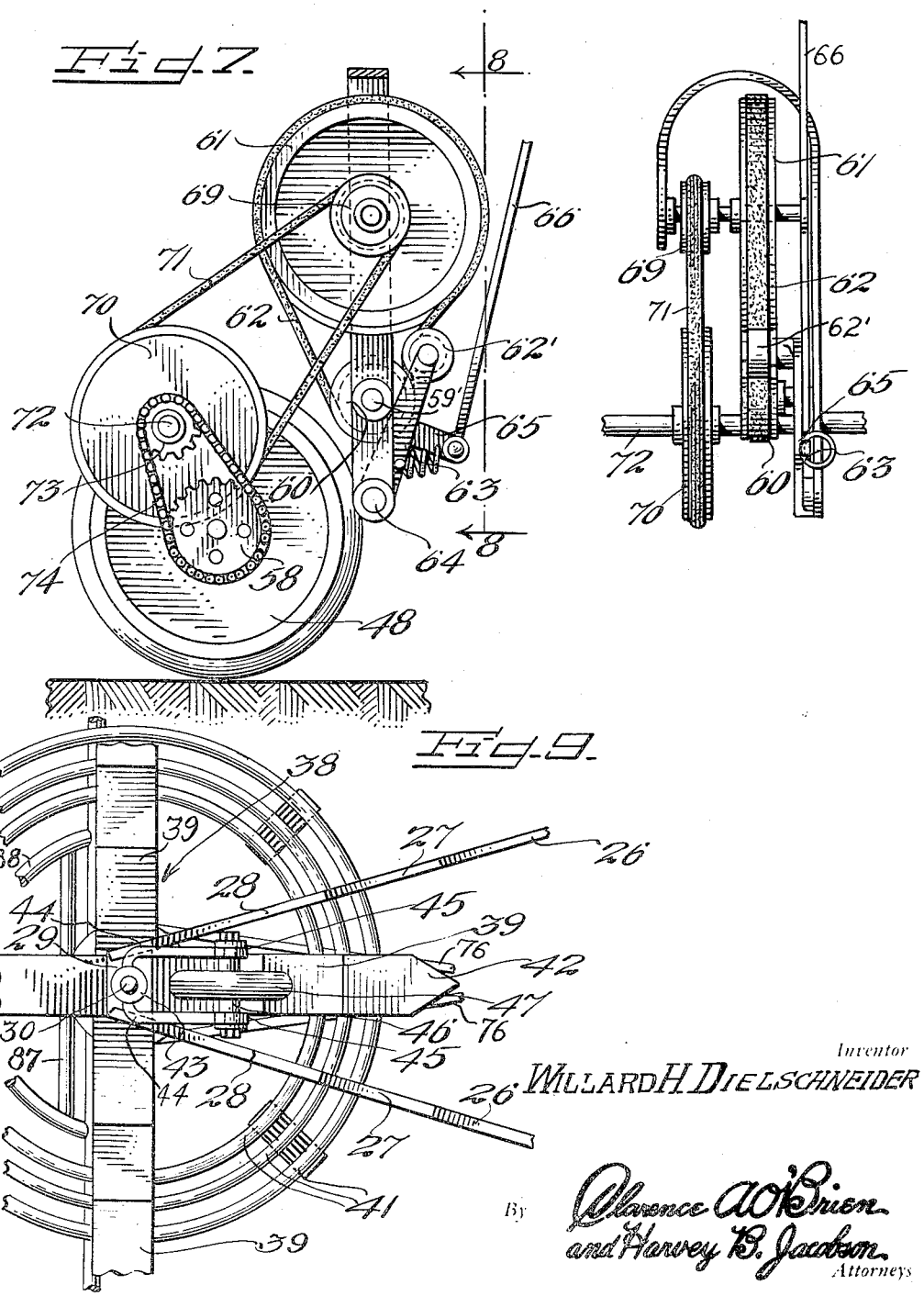
Inventor
WILLARD H. DIELSCHNEIDER
By Clarence A. O'Brien
and Harvey B. Jacobson
Attorneys Patented Mar. 13, 1951

2,545,074

UNITED STATES PATENT OFFICE 2,545,074

DISK TYPE MOWER

Willard H. Dielschneider, Conrad, Iowa

Application December 19, 1945, Serial No. 635,995

3 Claims. (Cl. 56—25.4)

This invention relates to a weed cutter and has for its principal object to guard the operating mechanism from contact with the weeds and grass being cut so as to avoid the entangling of the weeds and grass about the moving parts.

Another object is to facilitate the turning of the apparatus within a relatively short radius so that rows may be cut in close proximity to one another and the device practically reversed upon itself in making a return trip during the weed-cutting operation.

A further object of the invention is to control the elevation of the cutting blades so as to vary the height of the stubble left after the cutting operation in accordance with the desires of the operator.

Among its features my invention embodies a frame upon which the cutting mechanism and the drive apparatus therefor is carried, which frame is provided with guards which will protect the drive wheels and the operating mechanism from contact with the weeds and grass both before and after the cutting operation has been performed.

Another feature of the invention is an adjustable front caster wheel by which the height of the cutting blades above the ground may be varied and which will facilitate the turning of the device in a short radius.

Still other features include independently mounted drive wheels which are adapted to be driven in unison but are provided with suitable ratchet drive mechanisms by means of which the outermost wheel during the turning operation may be allowed to rotate at a greater rate of speed than the inner wheel.

Still other features include a common drive or power unit having means for continuously driving the cutter blades, and manually controlled means for governing the operation of the drive wheels.

In the drawings,

Figure 1 is a top plan view of a weed cutter embodying features of this invention showing the same with the hood thereof in dot-dash outline so as not to obscure the parts therebelow, Figure 2 is a side elevational view of a slightly modified weed cutter from that shown in Figure 1, this view showing the same with the left ground wheel and the mounting assembly therefor removed, and as in Figure 1, this view shows the hood removed with its normal position being indicated in dot-dash outline, Figure 3 is a fragmentary enlarged top plan view of the forward end of the device shown in Fig. 2, Figure 4 is a side elevational view partially in central vertical section of the structure illustrated in Figure 3, Figure 5 is a rear elevational view of the weed cutter shown in Figure 2, Figure 6 is a transverse sectional view taken substantially on the broken section line 6—6 of Figure 1 but showing only the lower portion of the frame and the drive and caster wheels, Figure 7 is an enlarged detail view of the drive control mechanism used in the weed cutters of Figures 1 and 2, Figure 8 is a vertical sectional view taken substantially on the line 8—8 of Figure 7, and Figure 9 is a bottom plan view of the forward end of the device illustrated in Figure 4.

Referring to the drawings in detail, attention is first directed to the form of the invention shown in Figures 2-9 wherein a frame designated generally at 15, which comprises a pair of spaced parallel side bars 16 provided, at their forward ends, with converging extensions 17 which are welded or otherwise secured at their convergent ends to a vertically extending sleeve 18. The side bars 16 have their rear ends secured to a transversely extending bar 19 the outer portions of which are bent forward at 19' to form forwardly directed extensions 20 that are on opposite sides of and in spaced parallel relation to the side bar 16, and in the same horizontal plane therewith. The forward ends 21 of the extensions 20 are curved inwardly and are rigidly secured to forward ends of the side bar 16 adjacent their junctions with the converging extension 17. Rising upwardly from a point slightly above the junction of the extensions 17 with the sleeve 18 and extending rearwardly therefrom and directly overlying the extension 17 are divergent reinforcing bars 22, the rear ends of which are bent to directly overlie the bars 16 and are arched downwardly, as at 23, so that their rear ends join the transverse bar 19 at its junction with the bars 16. Extending across the front side of the sleeve 18 in the same horizontal plane with the extensions 17 is a guard bar 24 which is of a length somewhat in excess of the overall width of the frame defined between the extensions 20 and is provided, at opposite ends, with convergent extensions 25 which project rearwardly therefrom and join the curved ends 21 of the extensions 20, as will be readily appreciated upon reference to Figure 1. Carried by the frame 15 and extending forwardly and downwardly from positions spaced directly below the forward ends of the bars 16 are convergent supporting bars 26 directly overlying the extensions 17 and 22, and which are provided with horizontal portions 27, the forward ends of which are provided with offset extensions 28 which, in turn, are joined at their forward convergent ends, by a horizontally disposed supporting plate 29 to which is welded or otherwise secured a depending stud 30 arranged in axial alignment with the sleeve 18, as will be readily appreciated upon reference to Figure 9.

Rotatably mounted in suitable anti-friction bearings 31 in the sleeve 18 is a shaft 32, the lower end of which is supported on a thrust ball 33, which, in turn, is supported on the plate 29 previously described. The shaft 32 is provided, near its lower end, with a squared portion 34 and a screw-threaded extension 35 upon which a clamping nut 36 is adapted to be received. The upper end of the shaft 32 carries a drive pulley 37 by means of which the shaft and the mechanism supported thereon may be rotated.

Mounted on the squared portion 34 of the shaft 32 is a sickle wheel, designated generally 38, which comprises radial arms 39, each of which is formed of a strip of strap iron having a rectangular opening midway of its length for the reception of the squared extension 34 on the shaft 32, as will be readily appreciated on reference to Figure 4. The radial arms are bent downwardly and outwardly, as will be readily appreciated upon reference to Figure 3, and attached to the upper face of each arm near its outer end is a stop 40, for a purpose to be more fully hereinafter explained. Welded, or otherwise secured to the arms in the immediate vicinity of the stop 40, is a ring shaped reinforcement and guard 41, by means of which the arms are sustained in proper position and weeds are prevented from becoming entangled with the arms and their driving mechanisms. Riveted or otherwise secured to the arms adjacent their extreme outer ends and abutting the stops 40 are cutter blades 42 corresponding in all respects to the ordinary knives employed on the sickle arms of mowing machines.

Mounted on the depending stud 30 carried by plate 29 at the forward end of the frame and directly below the sleeve 18 is a sleeve 43 carrying, at diametrically opposite points, arms 44 which extend rearwardly and downwardly in spaced parallel relation and terminate, at their rear ends, in vertically slotted extensions 45. An axle shaft 46 is mounted for vertical adjustment in the slots of the extensions 45 and rotatably mounted on the shaft 46 is a caster wheel 47 upon which the forward end of the device is supported.

The rear end of the weed cutter is supported on drive wheels 48, each of which is mounted for rotation upon anti-friction bearings 49 carried upon a shaft 50. Opposite ends of each shaft 50 are supported in an inverted, U-shaped member 51, the legs of which are provided with vertically extending slots 52 for the reception of bolts 53, to the outer ends of which are attached U-shaped brackets 54 which are adapted to partially embrace the side bars 16 and the parallel extensions 20. Projecting upwardly from the inner leg of each inverted U-shaped member 50 is an extension 54 having a vertical slot 55 for the reception of a bolt 56, to the inner end of which is attached a U-shaped bracket 57 which, as illustrated in Figure 6, partially embraces the parallel side portions 23 of the bars 22. It will thus be seen that the wheels 48 are held in vertically adjusted position with relation to the frame 15, so that the height of the device above the surface being traversed may be readily regulated. Attached to the hub of each wheel 48 for driving connection therewith is a sprocket 58 for a purpose to be more fully hereinafter described.

Supported in the frame 15 upon suitable cross members 58' extending between the side bars 16 thereof, is a prime mover, such as an internal combustion engine 59, to the drive shaft 59' of which is attached a drive pulley 60. Trained over the drive shaft 60 and arranged for driving connection with a pulley 61 is a belt 62. This belt has a loose connection about the pulleys 60 and 61 which is adapted to be taken up by an idler pulley 62' carried at one end of a lever 63 which is pivoted for movement about an axis 64 which is spaced from but located in a horizontal plane directly below the axis of the pulleys 60 and 61. A control arm 65 extends outwardly from the lever and is connected by means of a rod 66 which is adapted to be controlled by a hand lever 67 mounted for pivotal rotation about a stud 68 carried by one of the handles of the device to be more fully hereinafter described. Driven in unison with the pulley 61 is a pulley 69 which in turn has driving connection with a pulley 70 through the medium of a belt 71. The pulley 70 is mounted to operate a drive shaft 72 which extends transversely across the machine in front of the prime mover 59 and carries, at opposite ends, sprockets 73 over which drive chains 74 are trained. These drive chains have driving connection with the sprockets 58 so that when the sprockets 73 are rotated by the drive shaft 72, the drive wheels 48 will be rotated. The driving connection between the drive shaft 72 and the sprockets 73 is such that when one or the other of the wheels 48 rotates faster than the wheel on the opposite side, as, for instance, in making a turn, the sprockets 73 connected to said wheel will rotate harmlessly about the shaft 72 by employing any suitable conventional structure such as a pawl and ratchet, or an over-riding clutch. Inasmuch as such devices are well known in the art, a detailed description thereof is omitted from this disclosure.

Also having driving connection with the drive shaft of the prime mover 59 is a pulley 75 over which a belt 76 is trained. This belt 76 extends forwardly from the pulley 75 and is trained over the pulley 37 so that when the drive shaft of the prime mover 59 is in operation, the cutter wheel 38 will be driven. The prime mover 59 is mounted on the frame 15 to move longitudinally and attached as at 77 to the rear end of the prime mover mounting is a lever 78 which is operable about a pivot 79 to shift the prime mover forwardly or rearwardly on the cross members 58' and lock it in place by means of a quadrant 80. It will thus be seen that the tension on the belt 76 may be varied to insure proper driving power being transmitted to the pulley 37.

Pivotally mounted at 81 to the upwardly extending divergent bars 22 are handle bars 82 which are joined adjacent their upper ends by a transversely extending bar 83. The handle bars are provided, at their upper extremities, with hand grips 84, and depending from the handle bars 82, intermediate their ends, are links 85, the lower ends of which are adjustably connected, as at 86, to the arched portions 23 of the bars 22. It will thus be seen that by altering the adjustment at 86, the angle at which the handle bars 82 rise from the pivot points 81 can be regulated so as to regulate the elevation of the grips 84 to provide the maximum comfort for the operator of the device.

Extending transversely of the device in front of the guard bar 24 is a vertically arched supporting bar 87 which is mounted upon a horizontally disposed arched bar 88 carried by the guard bar 24. The arched bars 87 and 88 cooperate in supporting the forward portion of the hood 89, as shown in dot-dash outline in Figures 1 and 2, in place over the forward end of the weed cutter. The rear end of the hood 89, as shown in Figures 1, 2 and 5, is supported on a vertically extending arched bar 90 which rises from the bars 20 adjacent their forward ends and has its highest point above the top level of the prime mover 59 so that the hood 89 will serve to prevent weeds from falling into the operating mechanism and becoming entangled therein.

Attention is now directed to the somewhat simplified form of the invention shown in Figure 1. This form of the invention differs only in that the handles 91 are used instead of handles 82 in the other form of the invention, and that instead of the handles 91 being adjustably mounted on the bars 23, they are rigidly secured thereto as at 92.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what I claim is:

1. A weed cutter comprising a wheel mounted frame, a pair of supporting bars fixed to and projecting forwardly of the frame, said bars converging at their outer ends and a plate horizontally supported by the outer ends of the bars, a stud depending from the under side of the plate, a caster wheel swivelly mounted on the stud, an anti-friction bearing on the upper side of the plate, a vertical shaft mounted for rotation on the bearing, circumferentially spaced arms secured at their inner ends to the shaft and radiating therefrom, the outer ends of the arms being bent downwardly and outwardly from the shaft and terminating in horizontally disposed outer ends lying below the bearing and the plate, cutters mounted on the outer ends of each of the bars and projecting outwardly therefrom, a plurality of vertically spaced joined guard rings fixed on the outer ends of the arms and disposed concentrically about the arms, a prime mover mounted on the frame and connecting means establishing a driving connection between the prime mover and the shaft.

2. A weed cutter comprising a wheeled frame, a rotary cutter mounted on the frame for rotation about a vertical axis, said rotary cutter having the peripheral cutting elements thereof disposed in a horizontal plane spaced below the central portion of the cutter so that the under side of the cutter generates a domed surface upon rotation of the cutter, a caster wheel supporting the cutter, said caster wheel being mounted to freely swivel about the vertical axis of the cutter and within the dome-shaped space defined below the domed surface, and drive means for the cutter, said frame including a member extending below the cutter in closely spaced relation to the domed surface to a position below the central portion of the cutter, means carried by the member within the dome-shaped space for swivelly mounting the caster wheel, and anti-friction means carried by the member for supporting the central portion of the cutter.

3. A weed cutter comprising a wheeled frame, a rotary cutter mounted on the frame for rotation about a vertical axis, said rotary cutter having the peripheral cutting elements thereof disposed in a horizontal plane spaced below the central portion of the cutter so that the under side of the cutter generates a domed surface upon rotation of the cutter, a caster wheel supporting the cutter, said caster wheel being mounted to freely swivel about the vertical axis of the cutter and within the dome-shaped space defined below the domed surface, and drive means for the cutter, said frame including a member extending below the cutter in closely spaced relation to the domed surface to a position below the central portion of the cutter, means carried by the member within the dome-shaped space for swivelly mounting the caster wheel, and anti-friction means carried by the member for supporting the central portion of the cutter, said means for swivelly mounting the caster wheel including a plate carrying a depending stud in alignment with the axis of the cutter, a sleeve journaled on the stud, said caster wheel being secured to the sleeve for swivelling about the axis of the stud, said anti-friction means including a bearing mounted between the central portion of the cutter and the plate for supporting the cutter.

WILLARD H. DIELSCHNEIDER.

REFERENCES CITED

The following references are of record in the file of this patent:

UNITED STATES PATENTS

| Number | Name | Date |
|---|---|---|
| 143,787 | Sellers | Oct. 21, 1873 |
| 210,794 | Lusher | Dec. 10, 1878 |
| 2,047,336 | Stout | July 14, 1936 |
| 2,188,110 | Fahnestock | Jan. 23, 1940 |
| 2,194,617 | Scott | Mar. 26, 1940 |
| 2,253,452 | Urschel | Aug. 19, 1941 |
| 2,287,126 | Packwood | June 23, 1942 |
| 2,359,358 | Dielschneider | Oct. 3, 1944 |
| 2,399,778 | Wike | May 7, 1946 |